United States Patent Office 3,152,090
Patented Oct. 6, 1964

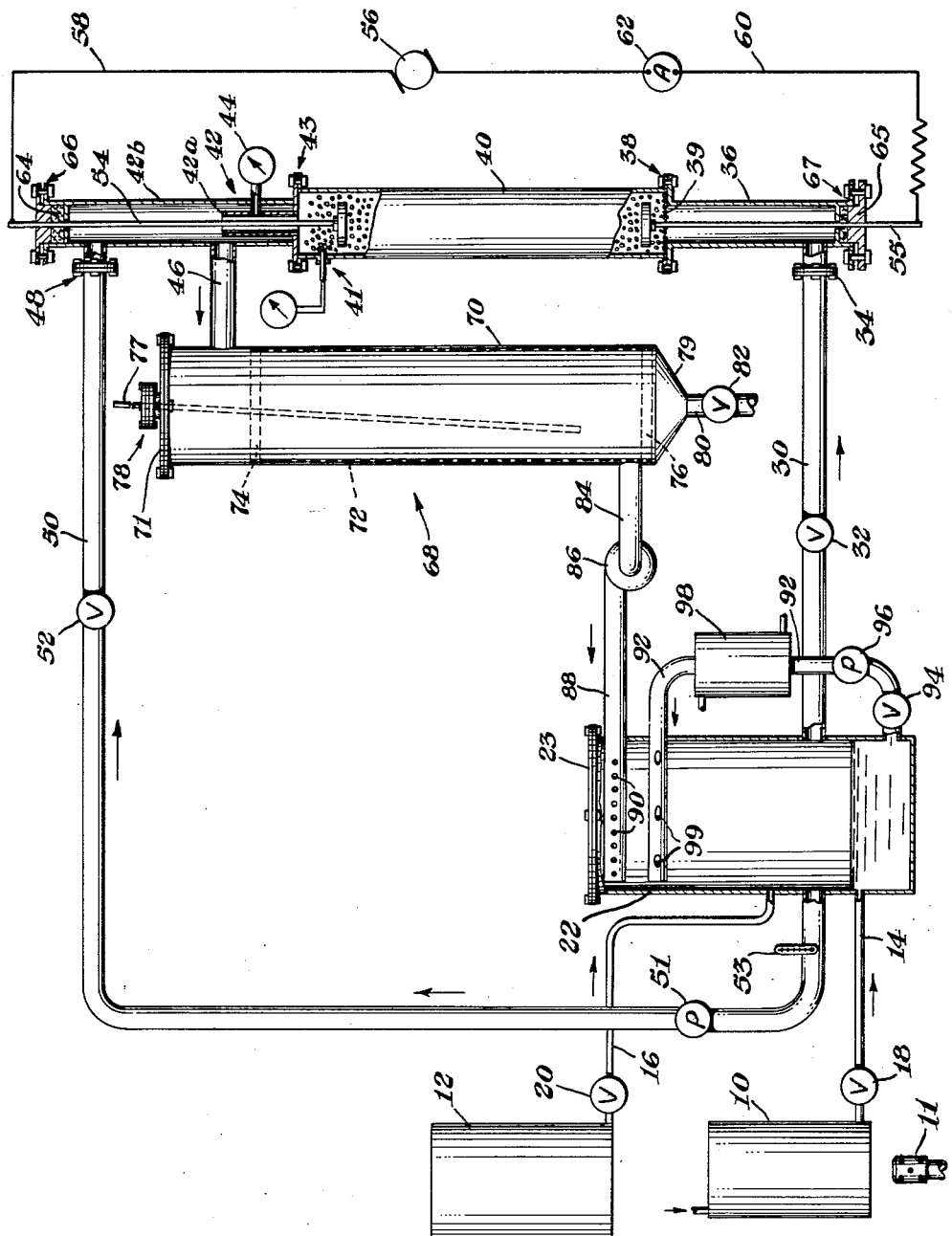

3,152,090
PRODUCTION OF TITANIUM TRIHALIDES
George B. Cobel and Paul R. Juckniess, Midland, Mich., assignors to The Dow Chemical Company, Midland, Mich., a corporation of Delaware
Filed Nov. 23, 1959, Ser. No. 854,964
14 Claims. (Cl. 252—442)

The invention is concerned with the production of $TiCl_3$ or $TiBr_3$ or such trihalide intermixed with the corresponding aluminum trihalide and is particularly concerned with an improved method of producing and recovering $TiCl_3$, $TiBr_3$, or one of such trihalides intermixed with the corresponding aluminum trihalide produced by passing vaporous $TiCl_4$ or $TiBr_4$ intermixed with an inert gas through a bed of particulate titanium metal or aluminum metal.

Trihalides of titanium either alone or in mixtures with the corresponding aluminum trihalides are of considerable importance in chemistry and industry. They are of particular importance as catalysts of certain chemical actions, e.g., the polymerization of olefins.

The surface area of the particles composing a given weight of a particulate material is frequently used as a measure of the particle size. Applying such measure to the particulate tribromide or trichloride of titanium or such trihalide intermixed with the corresponding aluminum trihalide, an acceptable size thereof for catalysis is one providing at least about 4 square meters per gram, and preferably at least about 10 square meters, and more desirably 20 to 30 or more square meters per gram.

Obtaining suitably finely subdivided $TiCl_3$ or $TiBr_3$ or such trihalide intermixed with the corresponding aluminum trihalide of satisfactory purity has long presented a problem. United States patent application S.N. 733,180, filed May 5, 1958, now U.S. 3,118,729, issued Jan. 21, 1964, described an improved method of producing $TiCl_3$ or $TiBr_3$ or such trihalide intermixed with the corresponding aluminum trihalide which is of satisfactory purity and particle size for use as a catalyst in certain chemical actions.

Briefly, the method of said application consists of passing a gaseous mixture consisting of a major proportion by volume of an inert gas and a minor proportion (preferably between 0.1 and 1.0 percent of the mixture) of either $TiCl_4$ or $TiBr_4$ through a bed of finely divided titanium or aluminum metal at a temperature of at least about 500° C. and preferably below 800° C. to produce $TiCl_3$ or $TiBr_3$ or such trihalide intermixed with the corresponding aluminum trihalide, the trihalide or trihalides evolving from said bed as a vapor with the effluent inert gas and unreacted $TiCl_4$ or $TiBr_4$ and passing through a tube which is subjected to a cooling temperature below the condensation temperature of the $TiCl_3$ or $TiBr_3$ but above that of the $TiCl_4$ or $TiBr_4$ to convert the trihalide vapor to finely divided solids suspended in the gas, and recovering the thus finely suspended trihalide solids from the suspending gas by such means as a bag filter or an electrostatic precipitator.

The method described in S.N. 733,180 represents a definite advancement in the art of producing catalytic grade $TiCl_3$ or $TiBr_3$. However, the heating means employed for the particulate titanium or aluminum metal in the reaction vessel is conventional, e.g., gas burner, electric coil, or the like. Since the material of which the reaction vessel is composed must be resistant to the attack of the heated titanium metal, it cannot be made of commonly employed structural metals but is usually made of a thermally poor or non-conducting material, e.g., an $SiO_2$ material such as Vycor or the like. As a consequence, heat transfer through the walls of the vessel is extremely slow. Furthermore, titanium metal in a particulate state is a poor conductor of heat and the rate of heat transfer through a body of the reaction mixture is also slow.

The trihalide or trihalides produced according to S.N. 733,180 usually contain small percents of the corresponding dihalide. For a number of purposes the presence of such dihalide in small amounts, e.g., less than about 2 percent is not objectionable, but it has recently been found that the presence of an appreciable amount of $TiCl_2$ or $TiBr_2$ in trihalides lessens their usefulness for a number of catalytic purposes among which is the catalysis of the polymerization of ethylene and propylene.

Although the particle size of the trihalide or trihalides produced according to S.N. 733,180 is satisfactory for catalytic purposes, the attainment thereof has required a gaseous feed mixture which is relatively lean in the tetrahalide and at a relatively high space velocity, i.e., not less than 20,000 volume units of gas per volume unit of particulate metal per hour.

The rate of cooling of the thus formed vaporous trihalides to the gas-suspended solids is an important factor in determining the particle size; the faster the rate of cooling, generally, the finer the particle size, and hence the more desirable the product for the purposes of catalysis.

Accordingly there is a need for a more efficient method of producing catalytic grade $TiCl_3$ or $TiBr_3$ or such trihalide intermixed with the corresponding aluminum trihalide by passing $TiCl_4$ or $TiBr_4$ intermixed with an inert gas through a heated bed of particulate titanium or aluminum and recovering the trihalide or trihalides thus produced.

An object of the instant invention is to provide an improved method by chilling or quenching the $TiCl_3$ or $TiBr_3$ vapor produced by the method of S.N. 733,180 whereby the rate of cooling is rapid to produce expeditiously and consistently a superior catalyst composed of desirably finely subdivided particles. Another object of the invention is to provide a method which both chills the $TiCl_3$, $TiBr_3$, or such trihalide intermixed with the corresponding aluminum trihalide being produced, and also converts $TiCl_2$ or $TiBr_2$ present therein to $TiCl_3$ or $TiBr_3$. A further object of the invention is to provide a method of heating the bed of particulate titanium or aluminum more effectively and efficiently.

The method by which these and related objects can be realized is set forth in the ensuing description, particularly when read with reference to the annexed drawing, and is succinctly defined in the appended claims.

The invention is an improved method of producing $TiCl_3$ or $TiBr_3$ either substantially pure, or intermixed with the corresponding aluminum trihalide, when so desired, in a fine state of subdivision, by passing a gaseous mixture of either $TiCl_3$ or $TiBr_3$ and an inert gas through a bed of finely divided metallic titanium or aluminum, heated, preferably internally, to a temperature of between 500° and 900° C. and preferably between 600° and 800° C. to produce a vaporous effluent comprising $TiCl_3$ or $TiBr_3$, chilling said effluent by contacting it as it evolves from said bed with a cooled inert gas (preferably containing sufficient $TiCl_4$ or $TiBr_4$ vapor to convert any $TiCl_2$ or $TiBr_2$ present in the effluent gas to $TiCl_3$ or $TiBr_3$), thereby to condense the $TiCl_3$, $TiBr_3$ and any $AlCl_3$ or $AlBr_3$ present therein to finely subdivided solids suspended in the effluent gas remaining uncondensed, and thereafter recovering the suspended solids from the uncondensed effluent gas by filtration, cyclone separation, or electrostatic precipitation or by the employment of other separatory means for recovering gas-suspended solids from the suspending gas.

The bed of particulate titanium or aluminum metal is preferably heated by means of electrodes embedded in each end of the bed. Either D.C. or A.C. may be employed. The heat is thus produced internally immediately in the vicinity of the reactants. The resistance afforded by the interstitial spaces is sufficient to provide, economically, adequate heat for the reaction.

The drawing schematically illustrates an apparatus suitable for the practice of the invention. In the drawing a $TiCl_4$ or $TiBr_4$ reservoir is represented by numeral 10. Burner 11 is positioned beneath reservoir 10 to heat and thereby convert $TiBr_4$ to a liquid when the tetrabromide is employed. Reservoir 10 is connected to a source of gas (not shown) so that the liquid in 10 may be put under pressure to provide a flow therefrom, as desired. Numeral 12 represents a supply source of an inert gas. Pipes 14 and 16, having flow-control valves 18 and 20 therein, respectively, to mixing chamber (sometimes referred to as scrubber) 22, having removable cover 23.

Pipe 30, having flow-control valve 32 therein, leads from scrubber 22 and is connected by bolted flange assembly 34 to pipe 36. Pipe 36 is connected by bolted flange assembly 38, having screen 39 therein, to reactor 40 (containing a bed of particulate metal resting on screen 39) to admit gaseous feed into the reactor. Thermocouple assembly 41 is shown inserted into the particulate metal bed near the outlet end of reactor 40.

Outlet pipe assembly 42 for the reactor is secured to the top thereof by bolted flange assembly 43 and consists of inner cylindrical wall 42a and outer cylindrical wall 42b concentric therewith. 42a provides an inner or central passageway for effluent vapor from the reactor and in conjunction with 42b, provides an outer annular space therebetween closed to the reactor. Pressure recording gauge 44 is shown connected to the inner passageway defined by 42a. The upper end of inner cylindrical wall 42a terminates at the opening into transfer pipe 46. The outer cylindrical wall 42b of assembly 42 continues upwardly (a distance beyond said opening into 46) and is connected at more-or-less a right angle by bolted flange assembly 48, to pipe 50 which delivers an incoming cooling or quenching inert gas thereto, from scrubber 22, at a greater pressure than the effluent vapors from reactor 40. Assembly 42, thus constructed, defines a mixing zone therein at the opening into transfer pipe 46 by providing a means for the cooling gas to more-or-less both envelop and intermix with the effluent gas as it leaves the reactor substantially at the termination of inner pipe 42a. The cooled gaseous mixture is then forced into the pipe 46 due to a lower pressure therein, as subsequently explained. Pump 51 forces the flow of cooling gas through pipe 50, the flow being controlled by valve 52. Thermometer 53 is secured in pipe 50 shortly after it leaves scrubber 22 for measuring the temperature of the contents thereof.

Electric current to heat the bed of particulate metal in reactor 40 is provided by adjustable electrodes 54 and 55, the terminal of each of which is embedded in opposite ends of the bed in the reactor and which is connected to oppositely charged poles of an electrical source, represented by generator 56, by means of wires 58 and 60, respectively, the latter wire having ammeter 62 therein. Packing 64 and 65 inserted about openings in flanged assemblies 66 and 67, respectively, provide a snug fit for the electrodes as they pass through openings provided therefor in the ends of pipe assembly 42 and pipe 36, respectively.

Transfer pipe 46 which leads from pipe assembly 42, as aforedescribed, enters the top of bag filter assembly 68 which comprises: outer shell 70, with removable flanged lid 71 thereon and cylindrical finely meshed fabric inner bag 72 suspended therein by means of upper ring 74 and lower ring 76. Passing through a hole in lid 71 is movable rod 77 extending into the interior of bag 72. It is fitted snugly in lid 71 by means of a packer inserted in flange assembly 78 and having a central hole therein. 78 excludes air from filter 68 but permits movement of rod 77 for dislodging adhering product from bag 72. Shell 70 has cone-shaped lower portion 79 terminating in pipe 80 provided with valve 82.

Outlet pipe 84 for vapors which pass through fabric bag 72 leads to blower 86 which aids in providing lower pressure in bag filter 68 and line 86 leading thereto than in assembly 42. The blower thereby impels the vapor from 68 into pipe 88 which extends into scrubber 22 near the top and contains perforations 90 in the portion thereof which extends into the scrubber.

Leading from a level in scrubber 22 below that of the entrance of tetrahalide liquid feed line 14 is recycle pipe 92 which is provided with control valve 94, pump 96, and cooler assembly 98. Pipe 92 extends into scrubber 22 at a point near the top thereof but below the entrance of pipe 88. It is closed at the end thereof and is equipped with a number of substantially equi-spaced nozzles 99 for releasing liquid $TiCl_4$ or $TiBr_4$ as a cooling spray into the interior of scrubber 22.

To carry out the invention, employing an apparatus of the type shown in the drawing, aluminum or titanium metal, usually titanium sponge, is fragmented or pulverized to a particle size of less than 2 inches and preferably to a particle size large enough to be retained on a number 20 sieve (U.S. Standard sieve series) but less than 2.0 inches. A bed of known volume of the pulverized metal is charged to reactor 40. The reactor is secured in place by flange assemblies 38 and 43. Electrodes 55 and 54 are positioned so that the terminals thereof are embedded to some extent in the charge. $TiCl_4$ or $TiBr_4$ is placed in reservoir 10. If $TiBr_4$ is employed, it is converted to a liquid by burner 11. The liquid in the reservoir is then placed under pressure. Valve 18 is opened and some of the tetrahalide liquid in the reservoir is admitted into scrubber 22. Valve 20 in pipe 16 is opened and inert gas from reservoir 12 thereby admitted into scrubber 22 where it intermixes with tetrahalide vapor.

Electrodes 54 and 55 are adjusted to make good electrical contact with the bed of particulate metal and an electrical source, e.g., generator 56, is put into operation and electrical current thereby caused to flow through the charge in reactor 40 between the terminals of electrodes 54 and 55 thereby to heat the bed.

Valve 32 is opened and the mixture of vaporous tetrahalide and inert gas is forced through pipes 30 and 36 into reactor 40 and thence through the electrode-heated bed of particulate titanium or aluminum metal therein where the $TiCl_4$ or $TiBr_4$ vapor reacts with the particulate metal to form a trihalide or trihalides, consisting substantially of either $TiCl_3$ or $TiBr_3$ when titanium metal is employed or a mixture of $TiCl_3$ or $TiBr_3$ and the corresponding aluminum trihalide when aluminum metal is employed, together with a small percent of dihalide. The halides thus formed evolve as a vapor from the bed and are carried upwardly by the inert gas and unreacted vaporous tetrahalide into the inner cylinder of pipe assembly 42.

Valve 52 in pipe 50 is opened and pump 51 started which causes a flow of a cool mixture of inert gas and vaporous $TiCl_4$ or $TiBr_4$ from scrubber 22 to pass through pipe 50 into the gas-mixing zone provided by pipe assembly 42.

The cooled inert gas mixture from pipe 50, is thus brought into direct contact with the mixture of evolving hot trihalides and inert gas in pipe assembly 42 and quenches or chills the trihalide or trihalides therein to form a smoke, i.e., finely subdivided solid trihalides suspended in the inert gas. The TiCl₄ or TiBr₄ present in the quenching inert gas from pipe 50 reacts with dihalides present in the effluent gas from the reactor and converts them also to TiCl₃.

The effluent gas and condensed trihalides thus suspended threin then pass into bag filter assembly 68 and downwardly therein, the inert gas and any unreacted TiCl₄ passing through the inner fiber bag 72 (usually of fine mesh, hard-finish wool gabardine or the like) into the annulus space between bag 72 and shell 70 and on into pipe 84. The finely subdivided TiCl₃ solids, containing also AlCl₃ where aluminum metal is employed, are filtered out by the bag filter assembly and collect on the inner walls of bag 72 from which they are subsequently removed by known methods, some of which are suggested hereinafter. The inert gas thus stripped of trihalides is drawn through pipe 84 by blower 86 into pipe 88 and forced outwardly therefrom through perforations 90 into scrubber 22.

Valve 94 in recycle pipe 92 is opened and pump 96 started and continued in operation at a regulated speed. Liquid TiCl₄ or TiBr₄ is thereby recycled through cooler 98 and out through nozzles 99 to saturate, substantially, the inert gas in scrubber 22 with the tetrahalide and to cool the mixture thus produced to the desired temperature for use in the quench gas. The temperature of the feed mixture for the reactor is not highly critical and is that of the quench gas which can be ascertained by reading thermometer 53. If desired, either cooling or heating means may be provided in line 30 to control further the temperature of the gaseous feed mixture.

The inert gas is usually introduced into the scrubber at room temperature. TiCl₄, when employed, is also usually introduced at room temperature. TiBr₄, when employed, must be melted and is usually then introduced into the scrubber at about 45° or 50° C. Some liquid tetrahalide is maintained in the bottom of scrubber 22.

The percent by volume of the TiCl₄ or TiBr₄ vapor in the inert gas mixture is not highly critical. Some inert gas is essential for the practice of the invention. Between 1 and 50 percent by volume TiCl₄ or TiBr₄ vapor in the gaseous tetrahalide-inert gas mixture is usually used, although as little as 0.01 percent or somewhat more than 50 percent may be used. The percent tetrahalide employed is somewhat dependent on other operating conditions such as space velocity, temperature of reaction, and temperature maintained in the scrubber. It is undesirable to have the tetrahalide content of the gas mixture too lean because the reaction taking place in reactor 40 (when Cl₄ is used), as represented by the equation:

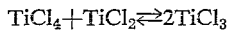

is reversible. Therefore, when the TiCl₄ content of the gaseous mixture is too lean, equilibrium of the reaction permits the reaction to proceed to an undesirable extent to the left thus lessening the yield of TiCl₃. Furthermore, when the tetrahalide content of the gaseous mixture is too lean, there is insufficient tetrahalide in the quench or chill gas to react with all the dihalide present in the reaction effluent gases. On the other hand, it is undesirable to have the gaseous feed mixture too rich in the tetrahalide because TiCl₃ or TiBr₃ is then formed faster than it is carried away and chokes the passage of gases through the reaction bed by clogging the interstitial spaces.

The percent by volume of tetrahalide vapor in the inert gas-tetrahalide gaseous mixture may be readily determined by ascertaining the temperature and pressure of the reaction and referring to a table of vapor pressures for the tetrahalide employed, since the ratio of the partial vapor pressure of the halide to the total pressure of the gaseous mixture is the same as the volume ratio thereof. The following table shows vapor pressures for TiCl₄ at a total pressure of 800 millimeters of mercury at the temperatures set out. The balance of the pressure is due substantially to the inert gas employed.

TABLE I

*Partial Pressure or Volume Ratio of* TiCl₄ *in Gaseous Mixture at Total Pressure of 800 mm. of Mercury*

| Temp. in °F | 500 | 600 | 700 | 800 | 900 |
|---|---|---|---|---|---|
| Partial Pressure in mm. of Hg | 1.0 | 14.0 | 110.0 | 600 | 2,100 |

Space velocity, i.e., the ratio of the volume of the gaseous mixture fed to the particulate metal to the volume thereof in the reactor per unit of time is not highly critical since particle size of the product is largely controlled by the improved heating means and particularly by use of the quench gas. It is recommended that the space velocity be that attained by passing between 1200 and 25,000 unit volumes of gas through a unit volume of the particulate metal per hour.

The following examples are illustrative of the practice of the invention:

EXAMPLE 1

An apparatus similar to that shown in the drawing was employed. A Vycor tube, 30 inches long and about 2 inches in diameter, was filled with particulate titanium sponge metal of a particle size ranging between a size too large to pass through a 20 mesh sieve and 0.5 inch along their greater dimension. The tube was wrapped with asbestos to reduce heating loss and positioned substantially as shown by reactor 40 in the drawing. A.C. was then passed through the bed of particulate titanium metal by means of electrodes embedded therein in the opposite ends of the elongated tube. The E.M.F. employed was 25 volts and the current was 100 amperes. The bed of titanium metal was heated to and maintained at a temperature of 700° C.

Liquid TiCl₄ and argon gas were introduced into a mixing chamber similar to the one shown as scrubber 22 in the drawing and the mixture thus made forced via pipes 30 and 36 through the bed of particulate metal in the reactor. Effluent gases, shown by analysis to consist essentially of 12.5 percent TiCl₄, 4.1 percent TiCl₃, 0.0044 percent TiCl₂, and balance argon, began evolving from the reactor. As the effluent gases began evolving from the reactor, valve 52 in pipe 50 was opened and a cool mixture of argon and TiCl₄ was admitted into reactor outlet pipe assembly 42. The cool gas mixture immediately condensed the TiCl₃ into finely divided solids suspended in the argon and unreacted TiCl₄ and also lessened the percent of TiCl₂ present to an immeasurable quantity. The pressure produced by the gaseous mixture as it evolved from the reactor registered on gauge 44.

The thus suspended TiCl₃ was carried into bag filter 68 where the TiCl₃ collected on the inner wall of fabric bag 72, some of which fell directly in hopper-shaped bottom portion 79. The inert gas-TiCl₄ gaseous mixture, by the aid of blower 86, was then carried on into scrubber 22 and there was released through perforations 90.

The space velocity (calculated as aforedescribed) was varied between about 5700 and about 22,000 unit volumes of gaseous mixture per hour per unit volume of particulate metal per hour.

When the inert gas-TiCl₄ gas began returning to the scrubber, liquid TiCl₄ in the scrubber was recycled through line 92 and discharged as a spray through nozzles 99 to cool the returning gas. The temperature of the quench gas leaving the scrubber, as shown by thermometer 53, was regulated by controlling the flow of liquid TiCl₄ through line 92 by means of pump 92 and valve 96 and by means of cooler 98.

The temperature of the quench gas is not highly critical so long as it is susbtantially below the condensation temperature of the trihalide or trihalides being produced, and substantially above the condensation or dew point temperature of the titanium tetrahalide employed and below the temperature of the reaction. It is to be borne in mind that the condensation temperature of $TiCl_4$, at the partial pressures thereof employed, is considerably below the boiling point of $TiCl_4$ at normal conditions. For example, the condensation or dew point of $TiCl_4$ at 26.5 mm. of Hg pressure is 40° C. and at 92 mm. of Hg it is 70° C. A cooling gas temperature of above about 100° C. (providing the pressure of the system is not such as to cause $TiCl_4$ to condense at that temperature) and below about 500° C. is usually employed, between about 50° and 150° C. being most commonly employed.

The run was then stopped. An air-tight connection was made between pipe 80 and a receptacle placed thereunderneath and valve 82 opened. Stirrer 77 extending into filter bag 72 was then moved about therein, striking and grazing the inner surface thereof, thereby dislodging substantially all of the $TiCl_3$ adhering to the bag. The dislodged $TiCl_3$ was recovered in the receptacle. The surface area of the $TiCl_3$ thus produced was determined and an analysis run thereon. The surface area was 58.8 square meters per gram by the B.E.T. method. The B.E.T. method is that devised by Brunauer, Emmett, and Teller and is described in the Journal of the American Chemical Society, vol. 60, page 309 et seq. (1938) and in the Atomic Energy Commission publication designated MDDC 1086 under "Graphical Surface Area Calculations" (1947) by Miles and McMillan. By analysis the recovered product in percent by weight was:

$TiCl_3$ ------------------------------ 99.14
$TiCl_2$ ------------------------------ 0.86

EXAMPLE 2

A second example was run. The partial pressure of $TiCl_4$ in the argon-$TiCl_4$ mixture at the temperature thus employed was 10 mm. of mercury and the total pressure was 750 mm. The space velocity was about 1200 volume units of the gaseous mixture per unit of the particulate metal per hour. Cooled argon was only was used as the quench gas, i.e., substantially no $TiCl_4$ was present therein. The particles produced had a surface area of about 33 square meters per gram. Analysis of the product produced, however, showed about 82 percent $TiCl_3$ and about 18 percent $TiCl_2$. This example, therefore, produced a product of satisfactory particle size and was substantially a pure mixture of $TiCl_3$ and $TiCl_2$. It would be satisfactory for a number of uses but contained more $TiCl_2$ than is desirable for use in catalyzing polymerization of short length carbon-chain olefin monomers into satisfactory large molecular weights.

A test run was made for comparative purposes substantially as the second example above except no quench gas was employed. The $TiCl_3$ product thus produced was condensed to suspended solids by merely passing the effluent gases through a pipe in contact with air at room temperature. Analysis showed the product to consist of about the same percents of $TiCl_3$ and $TiCl_2$ as the second example above but the surface area was 15.75 square meters per gram. This test run showed that when no quench gas was employed the particle size of the $TiCl_3$ produced was definitely larger and the $TiCl_3$ less desirable for use as a catalyst.

Reference to the two examples employing two modes of practicing the invention shows that a quench gas which suddenly cools the effluent gas from the reactor produces a $TiCl_3$ product of satisfactorily small particle size which is of premium grade for the catalytic purposes. A comparison of the two examples shows that the presence of $TiCl_4$ in the quench gas markedly lessens the $TiCl_2$ present in the $TiCl_3$ product.

Reference to the test run shows that when substantially no $TiCl_4$ gas is present in the quench gas employed, the $TiCl_2$ content of the product produced was both higher than desirable and consisted of undesirably large particles for certain specific uses, e.g., catalysis of polymerization of such olefins as ethylene and propylene. Other ways of lowering the $TiCl_2$ content which might be tried, e.g., employing a feed gas of especially high concentration of titanium tetrahalide in the reaction, have serious disadvantages, as aforesaid.

The practice of the invention employing a cool inert gas to chill and condense the $TiCl_3$ or $TiBr_3$ in the effluent gas from the $TiCl_4$ or $TiBr_4$ reaction with particulate Ti or Al metal clearly has a number of advantages. When the cool inert gas contains a high concentration of $TiCl_4$ or $TiBr_4$ gas, as the case may be, the dihalide content of the final product is greatly reduced at relatively no inconvenience or cost.

Although a $TiCl_3$ product of comparable quality could be produced by employing conventional heating means for the reaction with the cooling gas containing titanium halide, it could not be produced so efficiently nor economically as when the method of heating the reactor consists of imbedding electrodes in the particulate metal bed and utilizing the heat produced internally by the resistance to the passage of electric current by the bed in contrast to utilizing the heat produced by an external electric heater or combustion of a hydrocarbon, or the other known means. Furthermore, conventional means for heating the reaction bed of Ti or Al when passing Ti tetrahalide therethrough limits the cross section of the bed to one which is relatively small. Therefore, the practice of the invention employing the novel heating means makes possible large size reaction vessels and correspondingly larger scaled production units.

Having described the invention, what is claimed and desired to be protected by Letters Patent is:

1. The method of producing a finely subdivided metal trihalide product having a surface area of at least 4 square meters per gram consisting predominantly of a titanium trihalide which method comprises passing an inert gas containing, in admixture, at least 0.01 and not more than about 50 percent by volume of a titanium tetrahalide vapor selected from the class consisting of $TiCl_4$ and $TiBr_4$ through a bed of particulate metal reactive with the titanium tetrahalide and selected from the class consisting of titanium and aluminum having a particle size of between about 20 mesh and about 2 inches at a temperature of between 500° and 900° C., the space velocity of said gas mixture being between about 1,200 and 25,000 unit volumes per hour to 1 volume unit of the particulate metal to form an effluent gas mixture consisting of the vaporous trihalide produced by the reaction between said vapor and said particulate metal, intermixed with the inert gas evolving from said bed, contacting the gas mixture with an inert gas at a temperature above the condensation temperature of the titanium tetrahalide being employed at the existing partial pressure thereof and below the condensation temperature of the titanium tetrahalide being employed at the existing partial pressure thereof and below the condensation temperature of the trihalide being formed to condense said trihalide into finely subdivided solids suspended in the inert gas, and separating the trihalide product from the suspending effluent gas.

2. The method of claim 1 wherein the bed of particulate metal is heated by the passage of electricity therethrough.

3. The method of claim 1 wherein the particulate metal is titanium.

4. The method of claim 1 wherein the particulate metal is aluminum.

5. The method of claim 1 wherein the percent by volume of the tetrahalide in said inert gas mixture is between 10 and 50 percent.

6. The method of claim 1 wherein the temperature of said bed while passing the tetrahalide therethrough is between 600° and 800° C.

7. The method of claim 1 wherein the separation of the suspended finely subdivided solid $TiCl_3$ product is effected by passing the gas containing solids through a bag filter.

8. The method of claim 1 wherein the separation of the suspended finely divided solid $TiCl_3$ product is effected by passing the gas containing solids through an electrostatic precipitator.

9. The method of producing finely divided substantially pure $TiCl_3$ having a surface area of at least 4 square meters per gram which comprises passing an inert gas through a source of $TiCl_4$ to saturate, substantially, the inert gas with the $TiCl_4$ and then passing the resulting gaseous mixture thus made into a bed of particulate titanium metal reactive with the $TiCl_4$ and having a particle size of between about 20 mesh and about 2 inches at a temperature between about 500° and 800° C. at a space velocity of between 1,200 and 25,000 volume units of said gaseous mixture per volume unit of said titanium metal to produce an effluent gaseous mixture of inert gas, unreacted $TiCl_4$ and $TiCl_3$ containing some $TiCl_2$ produced by the reaction between the $TiCl_4$ and the particulate titanium metal, and contacting said effluent gaseous mixture with a cooling inert gas substantially saturated with $TiCl_4$ at a temperature such that upon contact with the effluent gaseous mixture in a temperature of the resulting gaseous mixture below the condensation temperature of $TiCl_3$ but above the dew point temperature of $TiCl_4$ is produced whereby substantially all the $TiCl_2$ present is converted to $TiCl_3$ and all the $TiCl_3$ present and thus converted is condensed to finely subdivided solids suspended in the uncondensed gas, and passing the gaseous mixture containing the suspended solids through a separation means and recovering the thus separated solids.

10. The method of claim 9 wherein a temperature of reaction of between 600° and 750° is provided by passing electric current directly through the bed of particulate titanium metal.

11. The method of claim 10 wherein the temperature of said cooling gas is between 90° and 350° C.

12. The method of producing a finely subdivided metal trihalide product having a surface area of at least 4 square meters per gram and consisting predominantly of $TiCl_3$ which comprises passing an inert gas containing, in admixture, at least 0.01 and not more than 50 percent by volume of a titanium tetrahalide vapor selected from the class consisting of $TiCl_4$ and $TiBr_4$ through a bed of particulate metal reactive with the titanium tetrahalide vapor and selected from the class consisting of titanium and aluminum having a particle size between about 20 mesh and 2 inches, said bed having oppositely charge electrodes embedded near opposing sides thereof, heating said bed by passing electric current therethrough by means of said electrodes to maintain a temperature in the bed between 500° and 900° C., the space velocity of said gas mixture being between about 1,200 and 25,000 unit volume per hour to 1 volume of the particulate metal per hour to form an effluent gas mixture consisting of the vaporous trihalide produced by the reaction between said vapor and said particulate metal, intermixed with the inert gas evolving from said bed, cooling the effluent gas mixture to a temperature below the condensation temperature of the trihalide being formed to condense said trihalide into finely subdivided solids suspended in the inert gas but at a temperature above the condensation temperature of the tetrahalide in said effluent gas mixture at the existing partial pressure of the tetrahalide therein, and separating the trihalide product from the suspending effluent gas.

13. The method of producing a finely subdivided substantially pure mixture of $TiCl_3$ and $AlCl_3$ having a surface area of at least 4 square meters per gram which comprises (a) passing an inert gas through a source of $TiCl_4$ to saturate substantially the inert gas, and (b) then passing the gaseous mixture thus made into a bed of particulate aluminum metal reactive with the $TiCl_4$ in the gaseous mixture and having a particle size of between about 20 mesh and about 0.5 inch at a temperature of between 500° and 800° C., at a space velocity of between 1200 and 25,000 volume units of said gaseous mixture per volume unit of particulate aluminum metal, to produce an effluent gaseous mixture of inert gas, unreacted $TiCl_4$, and trihalides and dihalides produced by the reaction, and (c) contacting the effluent gaseous mixture with an inert gas containing $TiCl_4$ at a temperature such that, upon contact with the effluent gaseous mixture, a temperature in the resulting gaseous mixture below the condensation temperature of the trihalides present but above the condensation temperature of $TiCl_4$ is produced, whereby substantially all dihalides present are converted to additional trihalides and the trihalides present are subsequently condensed to finely subdivided solids suspended in the uncondensed gas, and (d) passing the gaseous mixture containing the suspended solids through a filtering medium to separate the suspended solids from the gas.

14. The method of claim 13 wherein the bed of particulate aluminum metal is heated by the passage of electricity therethrough.

References Cited in the file of this patent

UNITED STATES PATENTS

| | | |
|---|---|---|
| 2,760,857 | Gross et al. | Aug. 28, 1956 |
| 2,785,973 | Gross et al. | Mar. 19, 1957 |
| 2,925,392 | Seelbach et al. | Feb. 16, 1960 |
| 2,965,686 | Prill | Dec. 20, 1960 |

FOREIGN PATENTS

| | | |
|---|---|---|
| 757,873 | Great Britain | Sept. 26, 1956 |